Patented Feb. 10, 1931

1,792,088

UNITED STATES PATENT OFFICE

ROBERT HAAKE AND WALTER HAAKE, OF KLOTZSCHE, NEAR DRESDEN, GERMANY

PROCESS FOR THE MANUFACTURE OF SOLUBLE STARCH

No Drawing. Application filed May 15, 1928, Serial No. 278,048, and in Germany October 13, 1926.

An application has been filed in Germany, dated October 13, 1926, Number 108,402.

The present invention has for its object a process for the manufacture of a starch clearly dissolving in hot water.

Up to the present and for the manufacture of soluble starch, the starch was elutriated with solutions of chlorates or persalts or of diluted acids. In said process a washing and an artificial drying procedure as well as a precisely controlled supply of heat was a condition for obtaining the purpose aimed at. The processes in which the starch was mixed only with dry chemicals and without the use of water (as for instance according to the process described in the U. S. Patent No. 813,647 granted to Julius and Robert Haake) were not used in practice, largely for the reason that said process could never result in a really uniform exhaustion of all starch-bodies used, but always represented an irregular mixture of soluble and insoluble starch, which mixture when treated by hot water resulted in an impure and imperfect solution.

The object of the present invention consists in the manufacture of a clearly soluble and perfectly uniformly exhausted starch without the use of any artificial drying procedure and any supply of heat.

Said purpose is obtained by the addition of highly concentrated oxidizing liquids, especially hypochlorite solutions such as, for instance, eau de labarraque (sodium hypochlorite solution), eau de javelle (solution of salt, potassium carbonate and potassium hypochlorite), or the like by a mixing apparatus of intense action in such small quantities to the starch to be disintegrated that the starch still maintains its pulverulent form even after the addition mentioned, and is not at all transformed to a pulp or paste.

By said process, the heat of oxidation which was only very little noticeable in the disintegrating methods known up to now in consequence of the large quantities of water used and which up to now also remained commercially unprofitable for the process as a consequence of said heat being very low, has intensely been increased and is used for the exhaustion and the drying-process, so that in this new process any drying-procedure followed by a grinding-procedure is dispensed with.

Therefore, the technical effect of the object of the present invention consists in a very important simplification of steps and reduction of the costs necessary for the new method of manufacture in comparison with the method known up to the present and used for the disintegration of the starch by large quantities of liquids. However, in comparison with the known dry disintegrating procedure and in contrary to the latter, the new process enables the obtaining of a perfectly and uniformly exhausted pulverulent starch which does not contain any impure residue as for instance lime or the like.

*Example*

100 kilograms of a marketable starch are mixed with about 12 kilograms of a concentrated solution of hypochlorite of sodium by any of the known intense mixing-methods. After a very short time a development of heat of about 40 degrees centigrade will take place and after 12 to 24 hours the reaction is finished and a smell of chlorine can no longer be noticed. The starch manufactured in this manner is clearly soluble in hot water. The soluble starch thus manufactured contains, according to the foregoing example, no impurities with the exception of a practically negligible percentage of sodium-chloride. Said starch is in a floury condition and consequently needs no drying nor grinding.

What we claim is:

1. A process for the manufacture of a powdery soluble starch which consists in that a highly concentrated oxidizing liquid is added in small quantities to the starch to be disintegrated and intimately mixed with the same while maintaining the starch continuously in its powdery condition, thus elevating the heat of reaction to such an extent that the chemical transformation is performed without any residue and a sufficient evaporation of the little surplus of moisture originating from the disintegrating solution is effected.

2. A process for the manufacture of finely divided soluble starch, which includes, providing a quantity of starch-bearing material to be disintegrated, adding to said material a small quantity of a concentrated hypochlorite solution, and intimately mixing said material and said solution, whereby the mixture retains its pulverulent form while the heat of reaction serves to accelerate the oxidizing action of the solution as well as to evaporate the moisture originating therefrom.

In testimony, that we claim the foregoing as our invention, we have signed our names this 3rd day of May, 1928.

ROBERT HAAKE.
W. HAAKE.